Sept. 3, 1940.   J. R. LEX   2,213,709
ON THE FLY MULTIPLE SPOT WELDER
Filed Jan. 21, 1939   14 Sheets-Sheet 1

INVENTOR.
JOSEPH R. LEX
BY
Barnes, Kisselle, Laughlin & Raisch
ATTORNEYS.

Sept. 3, 1940.  J. R. LEX  2,213,709
ON THE FLY MULTIPLE SPOT WELDER
Filed Jan. 21, 1939  14 Sheets-Sheet 2

Patented Sept. 3, 1940

2,213,709

UNITED STATES PATENT OFFICE 2,213,709

ON THE FLY MULTIPLE SPOT WELDER

Joseph R. Lex, Detroit, Mich., assignor to General Motors Corporation, Detroit, Mich., a corporation of Delaware Application January 21, 1939, Serial No. 252,115

12 Claims. (Cl. 219—4)

This invention relates to mass production gang spot welding "on the fly."

In the drawings:

Fig. 4 is a plan view of the apparatus at the same welding station.

The modern all-steel body for automobiles is made up of a plurality of large stampings, the main ones of which are the cowl and windshield pillar stamping, the unit roof and rear panel stamping and the floor pan stamping. The floor pan stamping has a large number of adjuncts in the way of reinforcing channels, electric wiring supporting clips and rocker panels which have to be spot welded thereto. This is a difficult and time-taking job, if each weld had to be made by an operator. Multiple spot welders to do this work, while the work is stationary and the electrodes have been successively caused to engage the work, are old. But, these machines have their difficulties and breakdowns. It has also been proposed to do this welding with single electrodes at several welding stations, these electrodes operating on the repeat principle to do a line of welds. Both of these methods of welding are hard on the electrodes, due to the pounding, and are very noisy.

The present welding system operates on the principle of a large number of welding electrodes simultaneously gripping the work while the work is moving and then applying the current successively through the electrodes. There is no noise, no pounding of the electrodes and the welding goes on as the work moves along the conveyor.

Figure 1:
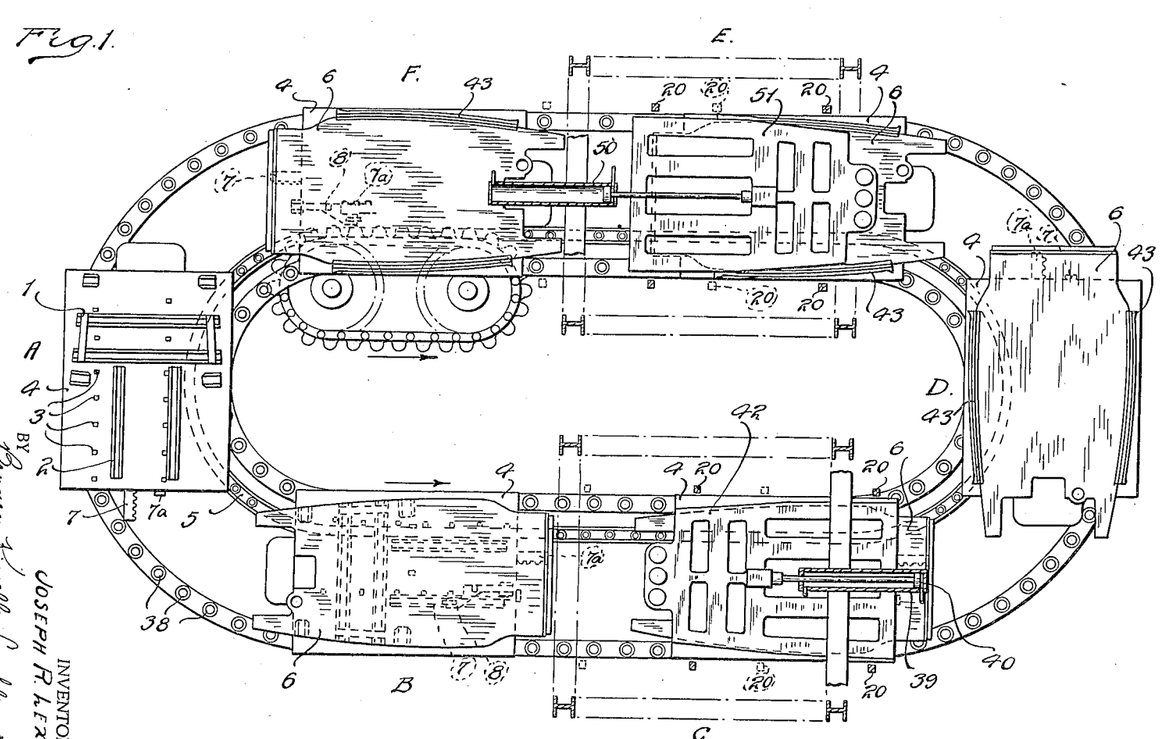
Fig. 1 is a plan view.
Figure 6:
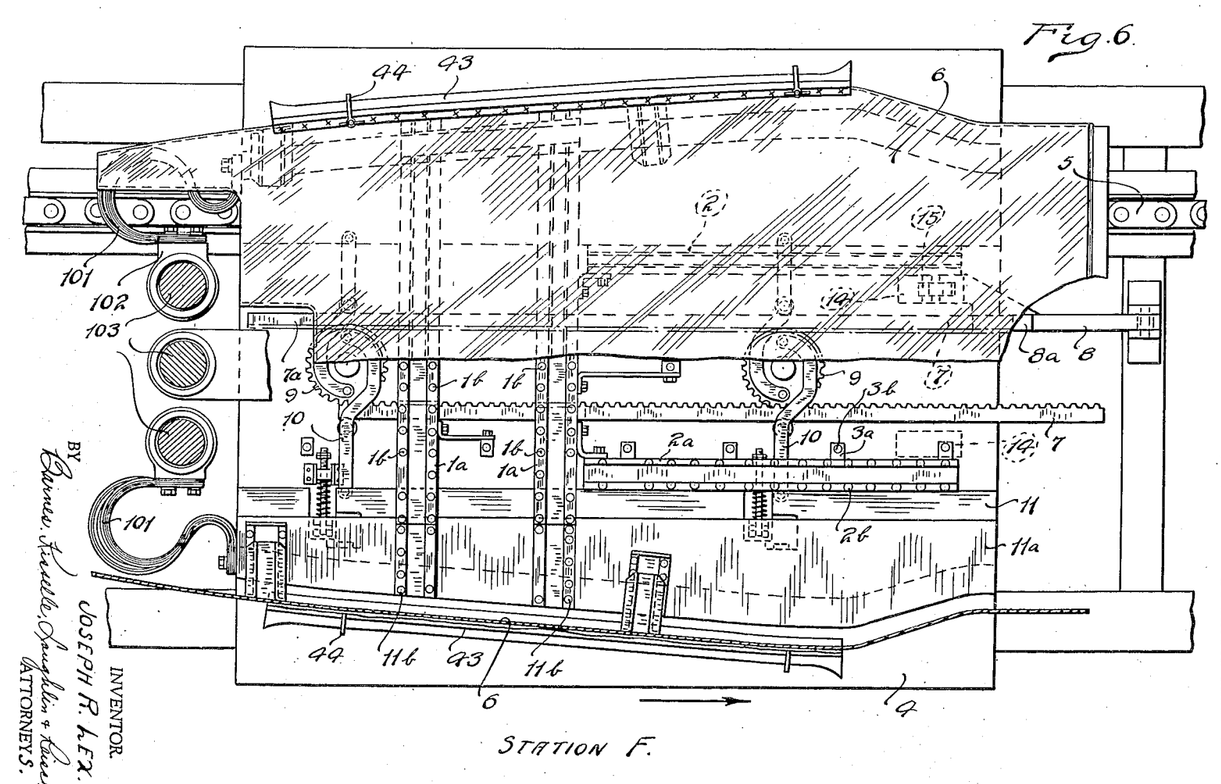
Fig. 6 is a plan view of the traveling fixture, together with the work partly broken away, after the work has been released at station F (Fig. 1).

Referring to Fig. 1: A is the loading station. Here, the transverse reinforcements 1, the longitudinal reinforcements 2 and the wire holding clips 3 are loaded onto the fixture 4. Suitable work supports (Fig. 6) 1a, 2a, and 3a (Fig. 3) are provided with electrodes 1b, 2b, and 3b. This loading is done while the conveyor chain 5 is moving the work. The station B is the loading station for the floor pan stamping 6. At this point, the rack 7 strikes a stop arm 8 (see Figs. 13 and 14) to cause relative movement between the rack and the fixture as it travels forward.

Figure 5:
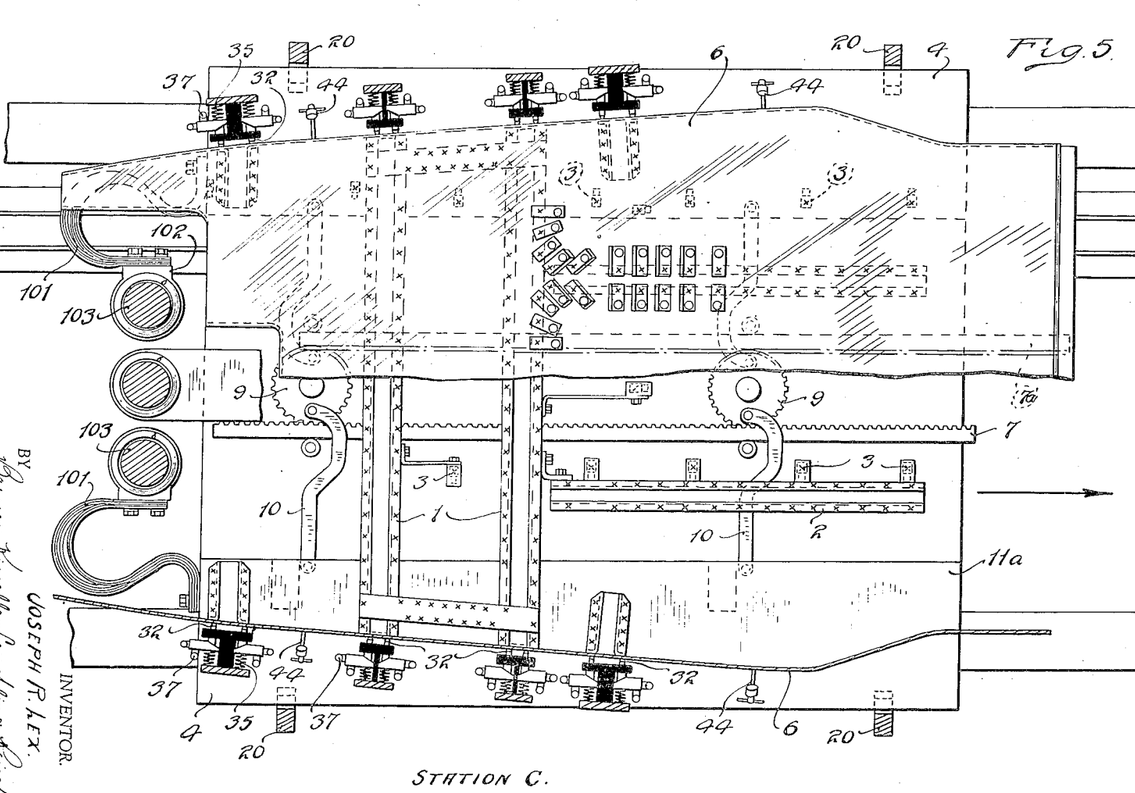
Fig. 5 is a plan view of the work on the traveling fixture at the first welding station (C) showing the welding electrodes for the sides of the work.
Figure 7:
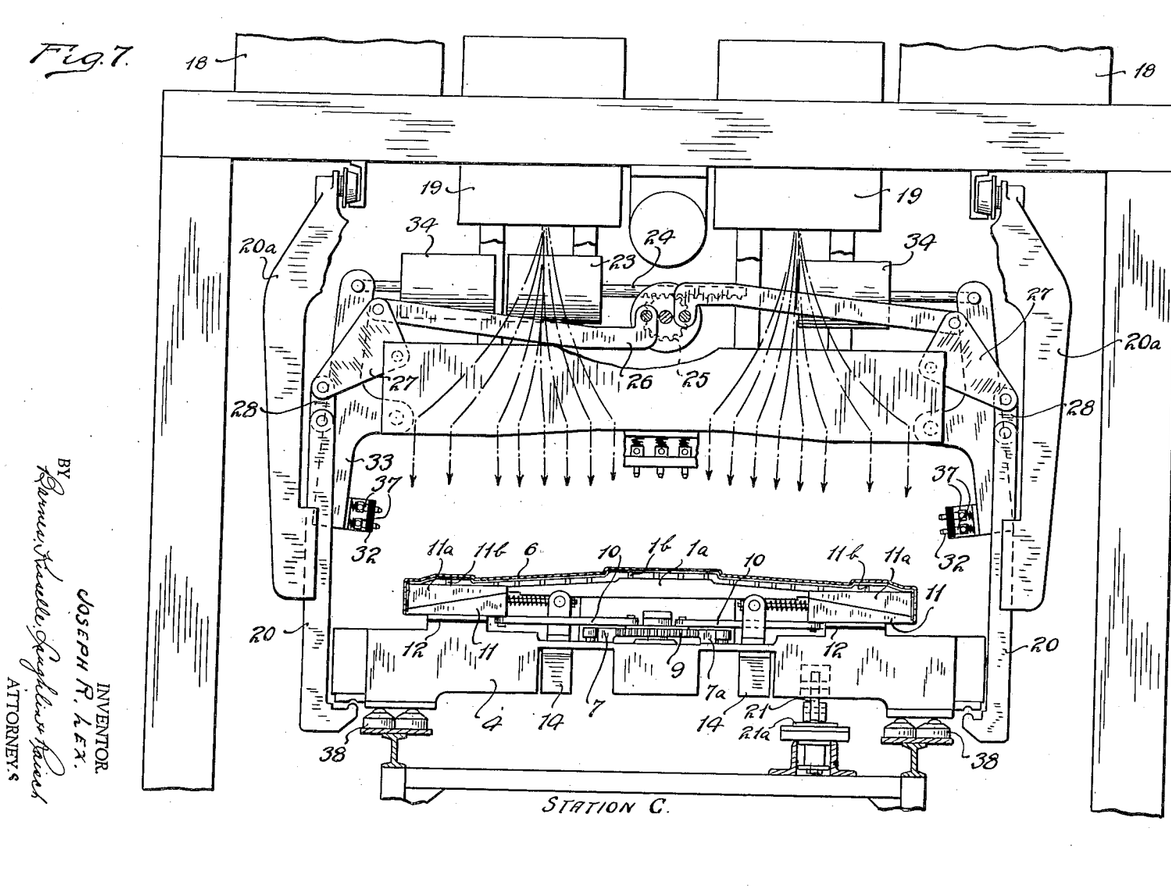
Fig. 7 is a front elevation of the welding apparatus just before the welding fixture is raised into contact with the welding head at the first welding station.
Figure 10:
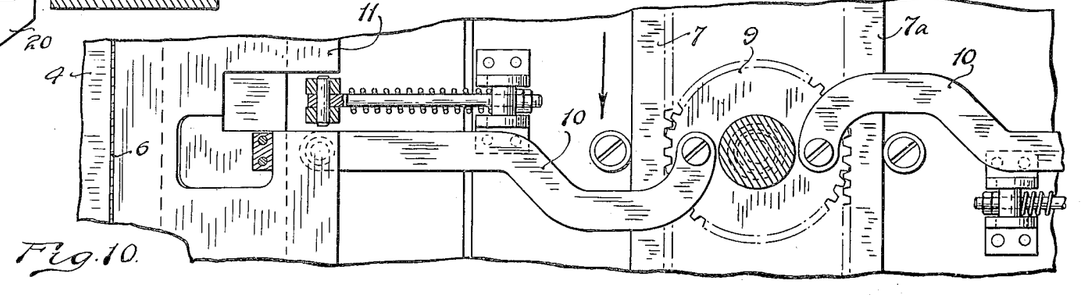
Fig. 10 is a fragmentary plan view of the same on the section line 10—10 of Fig. 9, showing the mechanism for expanding the electrode pads in welding position.

Refer to Fig. 10. This rack 7 is engaged with gear 9. A pair of links 10 connect with the gear so that, when the gear is partially rotated, it spreads these links spreading the slides 11 having the spring-pressed electrode pads 11a which are provided with electrodes 11b which grip the floor pan, as shown in Fig. 7. These clamping slides 11 and pads 11a are part of the secondary circuit and are insulated by the insulation 12 from the rest of the fixture. The flexible bus bars 101 connect the secondary pads with the secondary contacts 102 (Fig. 5). When the fixture is raised, these contacts 102 engage the spring-pressed upper secondary circuit contacts 103 (Fig. 3) which are connected with the transformers by the laminated cable 104 (Fig. 18).

Figure 12:
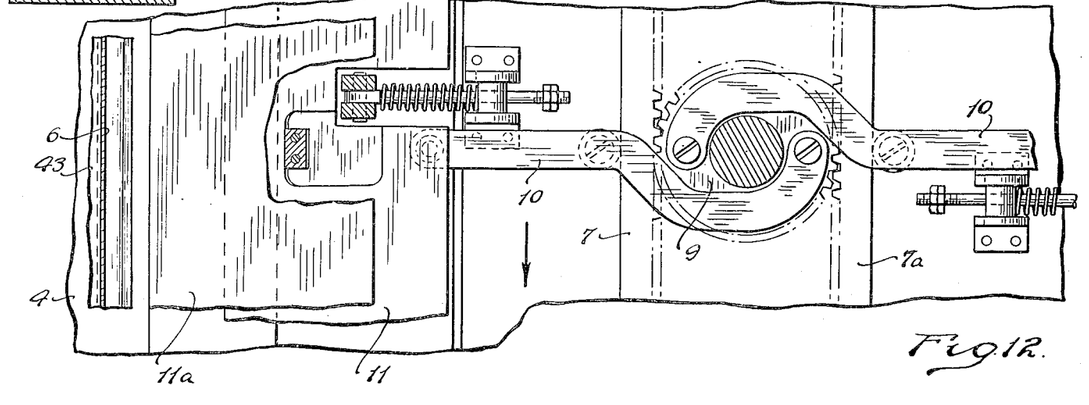
Fig. 12 is a fragmentary plan view of the same on the line 12—12 of Fig. 11.
Figure 13:
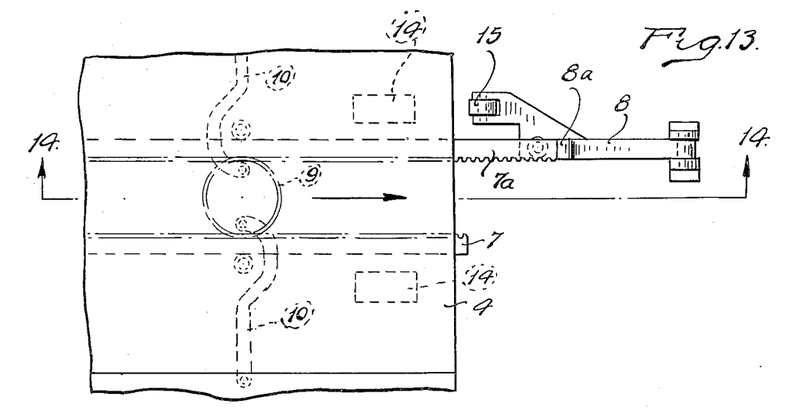
Fig. 13 is a fragmentary plan view of one of the welding fixtures showing how relative movement is afforded between the sliding rack and the fixture.
Figure 14:
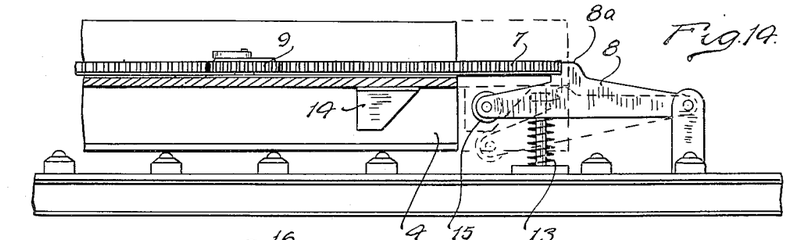
Fig. 14 is a section on the line 14—14 of Fig. 13.

Referring to Figs. 13 and 14: It will be seen how the relative movement between the racks and the fixtures is attained. A spring 13 tends to normally raise the stop arm 8 so that the stop shoulder 8a is in the path of the rack. When the rack 7a comes along, projecting in front of the fixture, as is shown in Fig. 13, the stop shoulder strikes the end of the rack and holds the rack stationary while the fixture continues to move along the conveyor. Inasmuch as the gear 9 is journaled on the fixture, which is moving, the holding of the rack causes the gear to rotate substantially a half turn from the position shown in Fig. 10 to the position shown in Fig. 12, thereby contracting the clamping slides 11. After the fixture has traveled a short distance (the distance between the end of the upper rack and the lower rack, shown in Fig. 13) the cam 14 on the underside of the fixture strikes the roller 15 on the end of the arm 8 and thereby releases the engagement between the stop arm 8 and the end of the rack so that the rack now slides over the top of the stop arm and the relative movement of rack and gear is stopped.

Referring to Fig. 1: It will be seen that there are two of these clamping arms 8, one at the station B which operates the sliding rack 7, and the other at station F (the unloading station) that operates the sliding rack 7a. This rack 7a operates the gear 9 in the opposite direction and draws the slides inwardly to release the work from the traveling fixture and prepare it for unloading.

Figure 18:
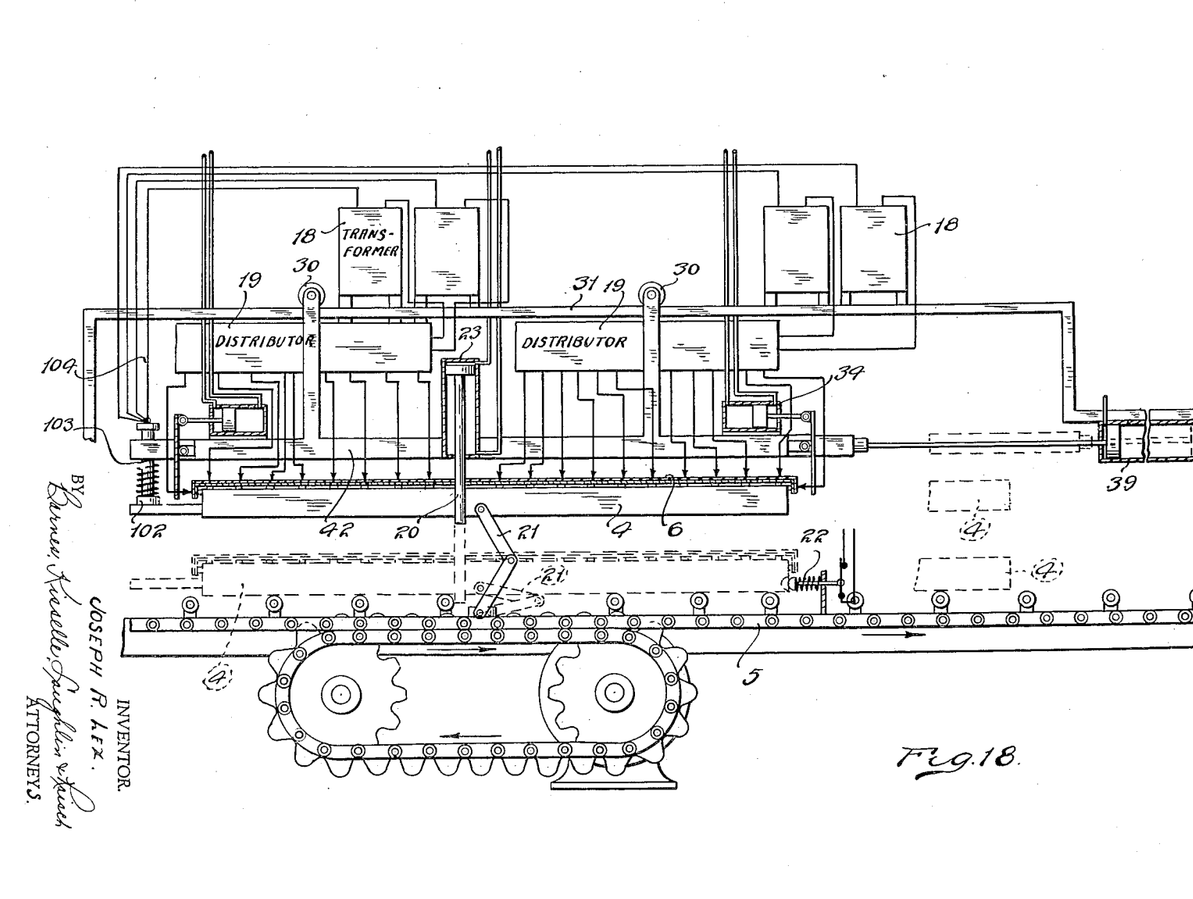
Fig. 18 is a diagrammatical side view at one of the welding stations showing how the fixture strikes a control switch which operates fluid valves which, in turn, control the hydraulic system that lifts the welding fixture and the work into engagement with the welding head.

There are four transformers 18 in connection with each welding head and two distributors 19 (see Fig. 18). It is not necessary here to detail the distributors. It is sufficient to say that the distributor is located in the secondary circuit and that shots of current are successively distributed to the electrodes which are in contact with the work which, in turn, is in contact with the slides which are connected, by the flexible conductors, with the distributor.

Figure 2:
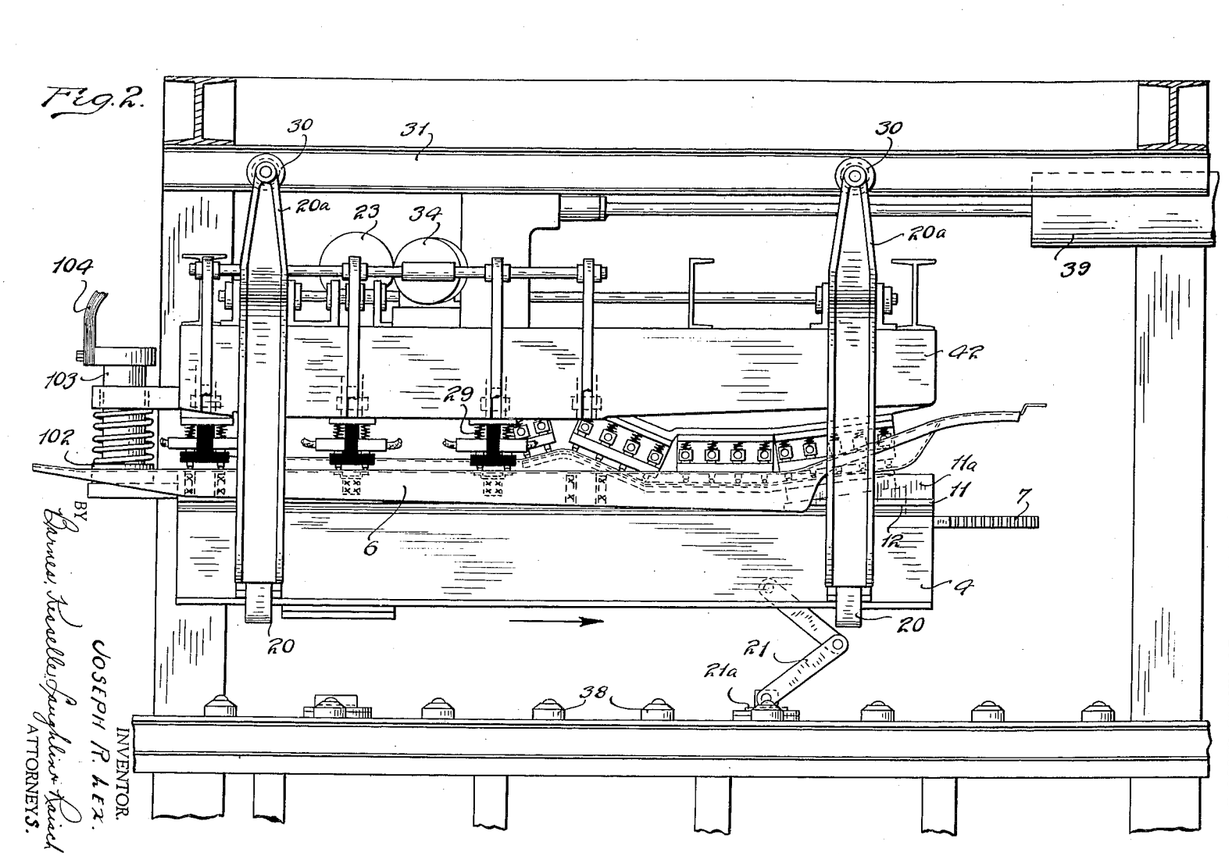
Fig. 2 is a side elevation of the apparatus in welding position at the first welding station C.
Figure 3:
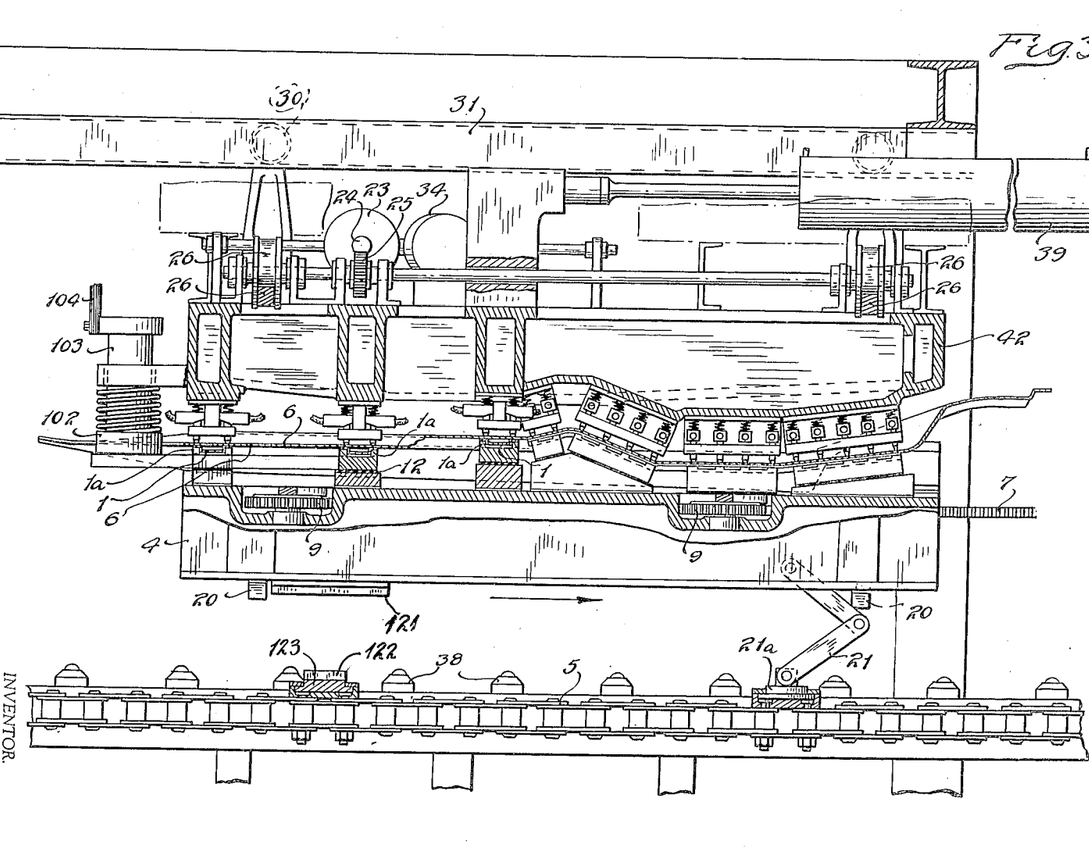
Fig. 3 is a view, partially in longitudinal section at the same welding station.
Figure 8:
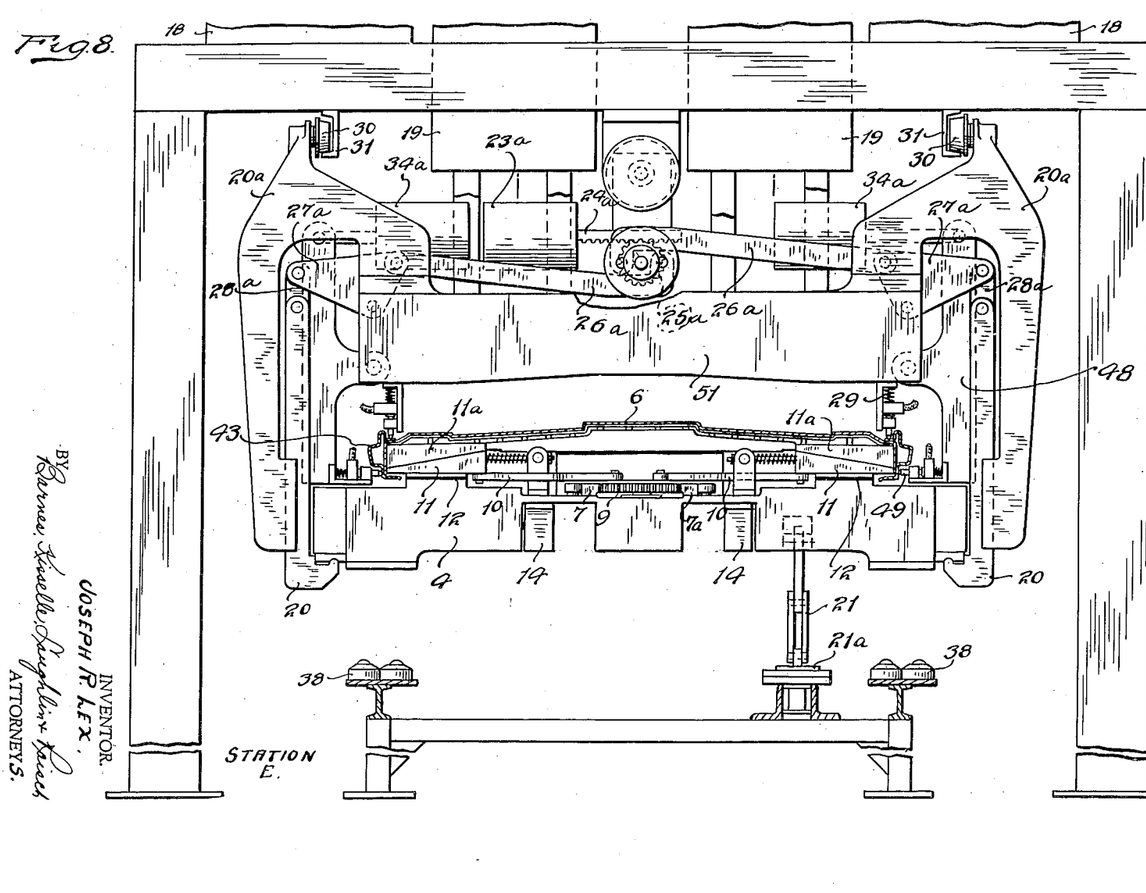
Fig. 8 is a front elevation of the work and the fixture after the latter has been raised into engagement with the welding head at the second welding station E.
Figure 9:
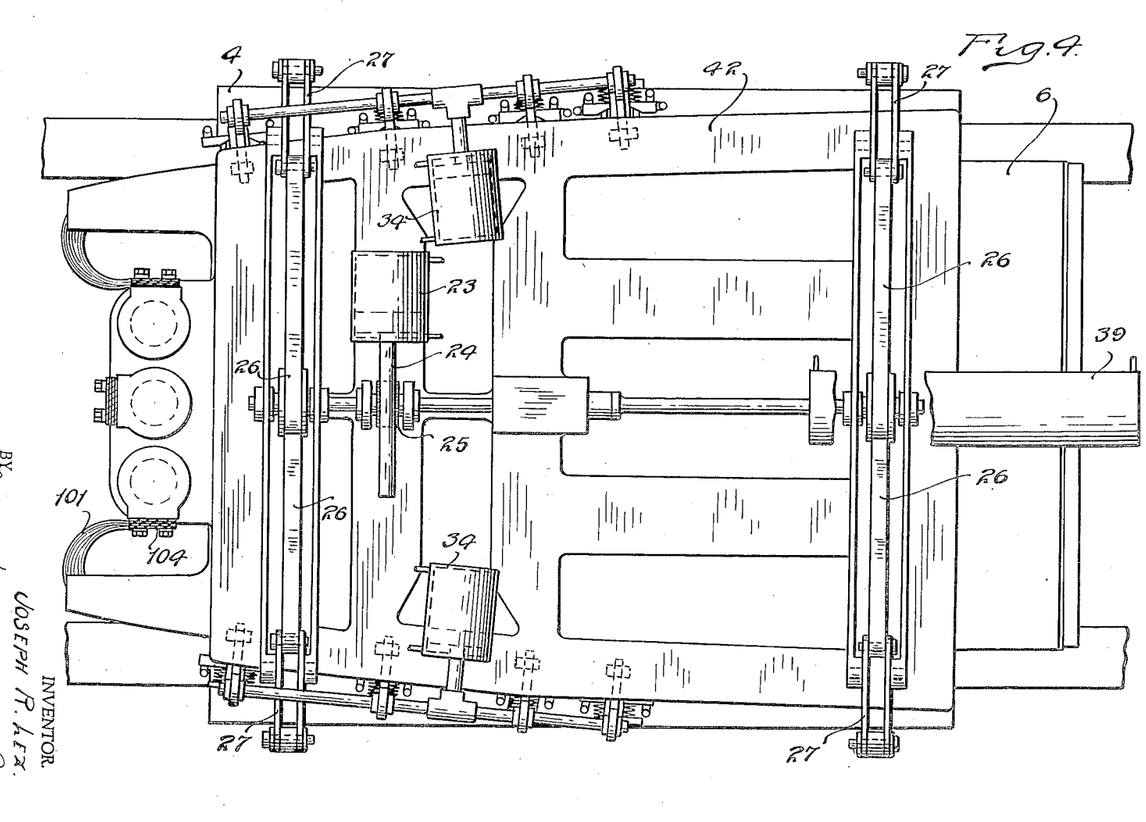
Fig. 9 is an enlarged cross section of the welding fixture, the welding head, and the work at the first welding station C with the expanding electrode pads of the welding fixture shown in welding position.
Figure 15:
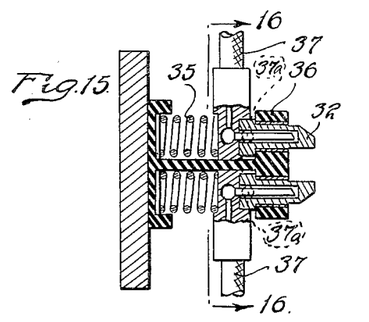
Fig. 15 is a detail cross section of one of the side electrodes on line 15—15 of Fig. 16.
Figure 16:
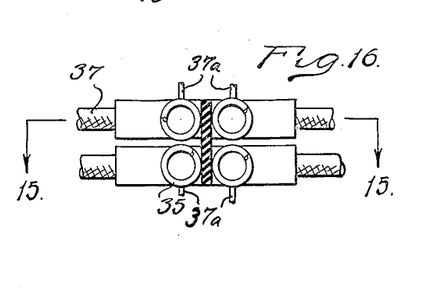
Fig. 16 is a cross section on the line 16—16 of Fig. 15.
Figure 17:
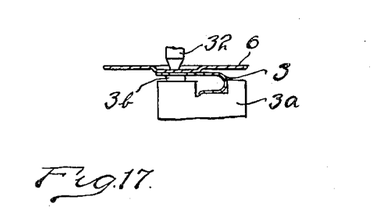
Fig. 17 is a detail of one of the wire supporting clips of the floor pan and the adjacent welding parts.

Referring to Fig. 7: It will be seen that the work is on the traveling fixture 4 which is just above the hooked ends of the lift arms 20. The work and the fixture as it arrives at the station will be seen in dotted lines in Fig. 18. The fixture has a draft connection with the conveyor chain in the form of a pair of foldable links 21 (Fig. 18). These have a swivel connection 21a to the chain 5 (Fig. 3). A tongue 121 on the bottom of fixture 4 engages a groove 122 in swivel 123 which is connected to chain 5. This prevents the lateral shifting of the fixture on the conveyor bed. The end of the fixture strikes the switch 22. This switch operates valves (later to be described) which, in turn, turn air or fluid into the cylinder 23 (Fig. 7) which operates the piston rack 24 which, in turn, operates the gear 25, links 26 and bell crank levers 27 which are connected, by links 28, with the lifting arms 20. These lifting arms are guided in arms 20a. This draws the lifting arms upwardly, lifting the fixture 4 and the work until they engage the electrodes, as shown in Figs. 2 and 3. A comparison of Figs. 7 and 8 will show the amount of the lift. These two views, however, represent different welding heads and stations. The Fig. 7 view shows the first welding station C and the Fig. 8 view the second welding station E. When the welding fixture and the work has been lifted into engagement with the upper electrodes, the welding head is coupled up to travel with the carriage by the grip of the electrodes and by the lifting arms. The upper electrodes are spring-pressed downwardly by the springs 29 (Figs. 2 and 8). It will be seen that the welding head is suspended on rollers 30 in the overhead tracks 31 so that the whole welding head, including the transformers and the distributors, moves along with the fixture. The two distributors distribute the current to the numerous electrodes, giving each a shot for a fraction of a second. The side electrodes 32 (Fig. 7), carried on arms 33 which are pivoted to the welding head, have been properly brought into contact with the work upon the side flanges of the floor pan by means of fluid cylinders 34 which are properly timed to do this. Figs. 15 and 16 show the details of the side electrodes which are pressed by springs 35 to grip the work yieldingly. These electrodes are fixed to the insulated electrode support 36 which is connected, by the water cooled cables 37, with the distributors. The cooling fluid is carried from the electrodes 32 by a base connected to the nipples indicated at 37a. These side electrodes, at the first welding station, spot weld the turned down ends of the reinforcing channels to the side flanges of the floor pan. These are clearly shown in Fig. 5.

Figure 19:
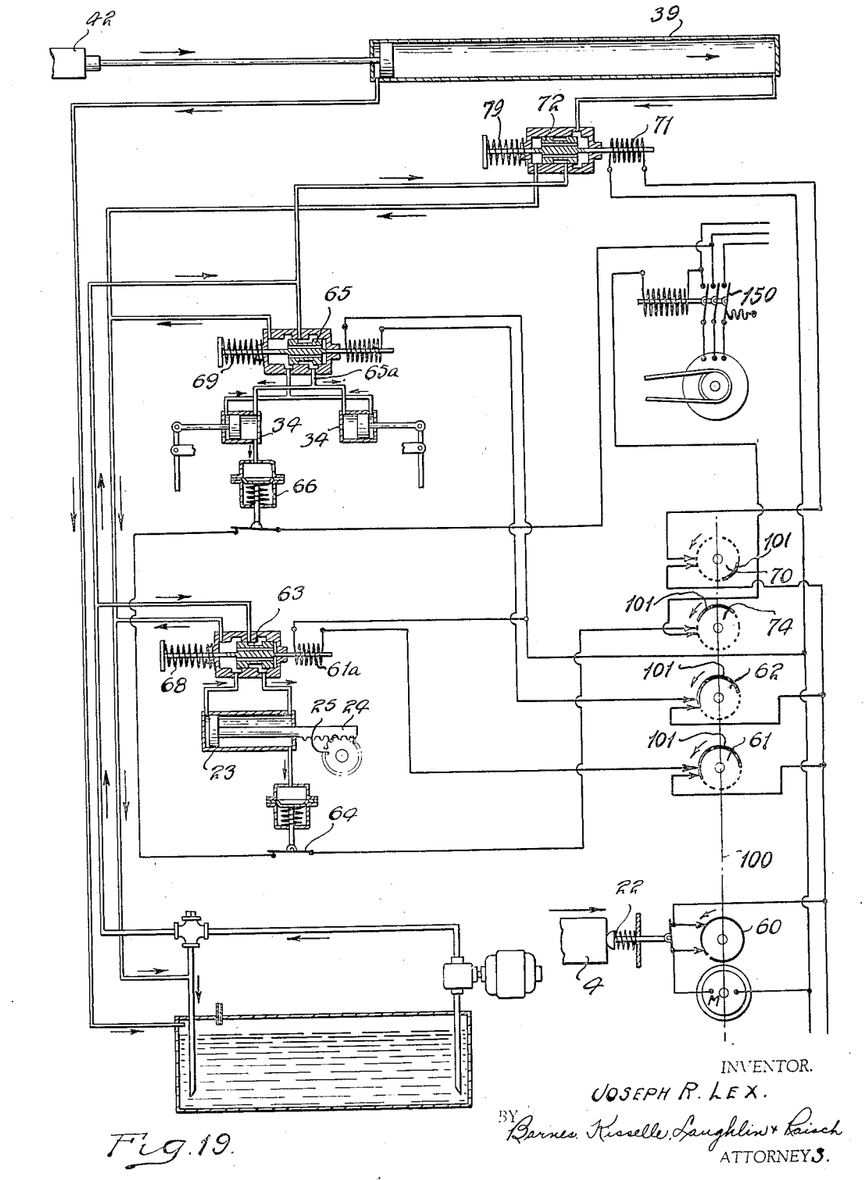
Fig. 19 is a diagram of the electrical and fluid circuits of the apparatus.

Turning to Fig. 19: It will be seen how the apparatus works. The fixture 4 strikes switch 22 which starts the motor M. The motor rotates the shaft 100 which is connected with the motor by suitable reduction gearing (not shown). The shaft 100 has fixed thereto axially spaced discs 60, 61, 62, 74 and 70 respectively. These discs are of insulating material and have segments 101 of predetermined lengths fixed to their periphery. The segments 101 are of electrical conducting material. The rotating switch 60 keeps the motor rotating during a definite cycle even though the switch 22 opens. The rotating switch 61 closes the circuit to the solenoid 61a which controls valve 63. This serves to shift the valve 63 to the right and allows the air to enter the right hand end of the cylinder 23, shifting the piston rod 24 to the left and rotating the pinion 25 counterclockwise to shift the linkage in the levers to lift the arms 20 and thereby lift the fixture from the position shown in Fig. 7 to the position shown in Fig. 8. The timing switch 62 similarly operates a valve 65 which directs fluid through conduit 65a into cylinders 34 to bring the side electrodes into engagement with the work. When proper welding pressure has been built up in cylinders 23 and 34, the fluid pressure operates the pressure switches 64 and 66 to close the distributor motor switch 150 when the rotating switch 74 closes. These timing switches go through a definite cycle of movement. Then, the circuits are broken and a spring returns the switch 150 to initial position, stopping the distributor, and then the springs 68 and 69 successively shift the fluid valves 63 and 65 respectively, thereby sending the pressure to the opposite ends of the cylinders 23 and 34 and releasing the side electrodes and dropping the arms 20. Thereupon, the timing switch 70 comes into play to energize the solenoid 71 and shift the valve 72 to turn the fluid into the cylinder 39 to return the welding head to its original position, when the circuit to solenoid 71 is broken and spring 79 shifts valve 72 to its initial position.

Fig. 19 shows the electrical circuit completed at timing motor switch 60, at switch 61 which controls solenoid 61a and at switch 62 which controls the solenoid on valve 65.

Figure 11:
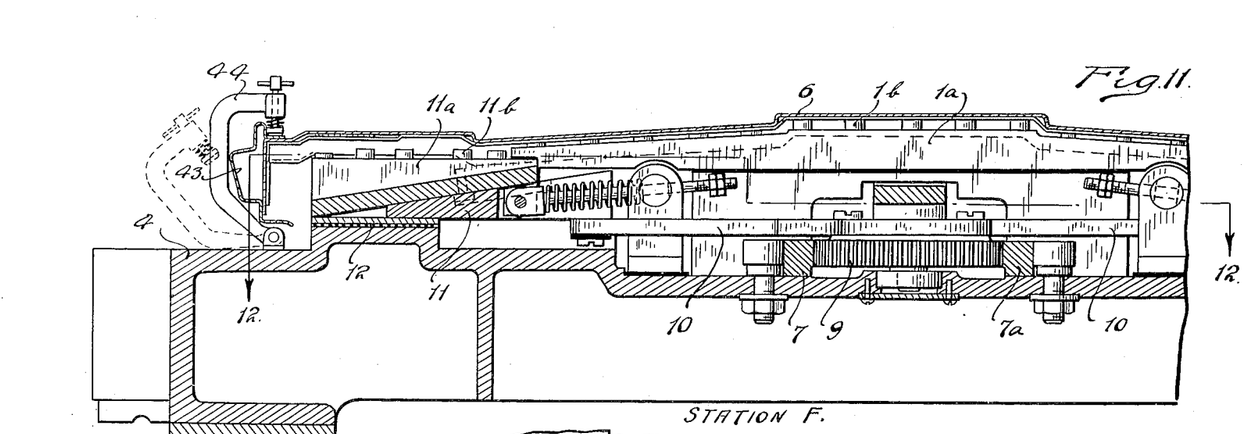
Fig. 11 is a fragmentary cross section through the welding fixture and the work at the second welding station before the expanding electrode pads are moved to the welding position.

The fixture, together with the work, moves on to station D to which the rocker panels 43 are clamped in position by throwing the pivoted clamps 44 (Fig. 11). The fixture, with the work, passes to the station E (Fig. 1) where the welding electrodes are caused to grip the work (as shown in Fig. 8). This is done in the same way by the fluid being turned into the cylinder 23a, spreading the arms 26a, thereby causing the carriage to be lifted from the dotted line position to the full line position and fluid also being turned into the cylinder 34a to bring the rocker arms 48, with the rocker panel electrodes 49, into engagement with the rocker panels. The distributors are then started and the welds are rapidly made as the work carries along. Then, at the proper time, the fluid in the cylinders 34a and 23a is reversed, releasing the electrodes the same as at station C. The fluid is then turned into cylinder 50 (Fig. 1) to return the welding head 51 to its initial position. The fixture moves on to station F at which point the stop arm 8 encounters the rack 7a, operating the pinions to release the clamping slides. The work may then be lifted off.

Figure 20:
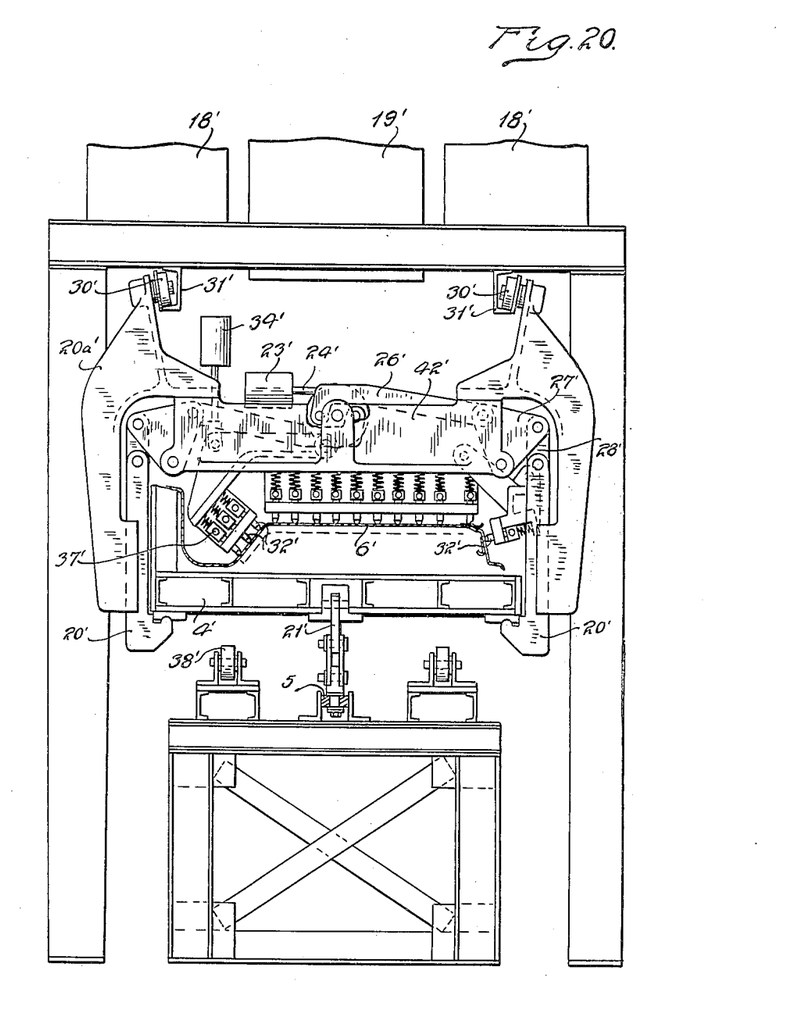
Fig. 20 is a front elevation of a welding station to weld the rear compartment floor pan. This is a modified form.

In Fig. 20, a slightly modified form of construction is shown in which welding is done upon the rear compartment floor pan. The details of this need not be explained as they are apparent from the drawings. The operation is practically the same except here the auxiliary or side electrodes are carried on arms that are positioned somewhat differently than in connection with the side arms that are used in welding in place the rocker panels.

I claim:

1. In a welding machine, a moving conveyor provided with an electrode fixture moving always in one direction with the conveyor for carrying separate work pieces and a gang welding apparatus provided with a plurality of electrodes adapted to move with the work and the fixture and weld the work pieces together while the same are moving.

2. In an automatic welding apparatus, the combination of a conveyor, an electrode fixture moving always in one direction with the conveyor, a gang spot welding head provided with a plurality of electrodes adapted to simultaneously contact the work and move with the work and the conveyor and a distributor for successively supplying electric energy to the various electrodes that contact with the work.

3. In a welding apparatus, the combination of a continuously moving conveyor, fixtures for carrying the work pieces to be welded and a plurality of stations including the loading station having means for automatically causing an electrode to engage and hold the work on the fixture, a welding station in which a gang welder is automatically caused to engage and move along with the work and weld it at a plurality of spots and an unloading station where the electrode is automatically released from the work to permit the work to be lifted off the fixtures.

4. In a welding apparatus, the combination of a moving conveyor, a plurality of work stations including a loading station, two welding stations and an unloading station, one or more fixtures moving always in one direction with the conveyor and arranged to carry the work through the stations, the work being loaded and unloaded at the loading and unloading stations respectively and being welded at the welding stations, the said welding stations having gang welders provided with a multiplicity of electrodes arranged to travel a short distance with the work during which time the fixture becomes part of the secondary circuit and give the work successive shots of current through successive electrodes as it moves along.

5. In a welding apparatus, the combination of a moving conveyor, a fixture carrying the work arranged to travel with the conveyor and provided with a common electrode for supporting the work, a welding head provided with a plurality of electrodes and means for automatically lifting the fixture with the common electrode and work into contact with the said plurality of electrodes to cause the head and the electrodes to travel along with the work for a short distance while the welding takes place.

6. In a welding machine, the combination of a moving conveyor, a fixture thereon provided with a common electrode on which the work is arranged to be carried, a movable welding head provided with a gang of spot welding electrodes including vertically and horizontally positioned electrodes, means for lifting the fixture and the work into contact with some of the electrodes and means for bringing the horizontally positioned electrodes in on the work at substantially the same time that the work moves into contact with the vertically positioned electrodes.

7. In a welding machine, the combination of a moving conveyor, a fixture carried on the conveyor, a pair of electrode slides for carrying the work and forming a common electrode and means for causing said slides to spread to engage the work and to contract to release the work and a welding unit adapted to engage the work to send the electric current through the work in a plurality of spots and into the electrode slides.

8. In a welding machine, a conveyor, a fixture carried on the conveyor, an electrode slide on the fixture for gripping the work and acting as a common electrode on the underside of the work, a rack, pinion and link arrangement for spreading the said slides and contracting the same and a stop arm located along the conveyor for engaging the rack to cause relative motion between the rack and the fixture to rotate the gear and move the slides.

9. In a welding apparatus, a moving conveyor, a fixture carried thereon, electrode slides located on the fixture for supporting the work and forming common electrodes, a pair of racks movable on the fixture, a pinion having teeth engaging the teeth of the racks, link connections between the pinion and the slides and stop arms, one for engaging one slide and the other the other slide, one to cause the slides to grip the work and the other to cause them to release the work.

10. In a welding apparatus, a moving conveyor, a fixture thereon, electrode slides located on the fixture for supporting the work and forming common electrodes, a pair of racks movable on the fixture, a pinion having teeth engaging the teeth of the racks, link connections between the pinion and the slides, stop arms, one for engaging one slide and the other the other slide, one to cause the slides to grip the work and the other to cause them to release the work, and cams on the fixture for releasing the racks from engagement with the stops to end the movement of the slides.

11. In a welding machine, a fixture, a conveyor for pulling the fixture along but connected with the fixture to permit the fixture to be lifted, the said fixture arranged to carry work parts to be welded together and a welding head provided with electrodes and arranged to travel with the conveyor and means for raising the fixture and work into pressure engagement with the welding electrodes to cause the same to travel along with the conveyor.

12. In a welding machine, a fixture, a conveyor for pulling the fixture along but connected with the fixture to permit the fixture to be lifted, the said fixture arranged to carry work parts to be welded together, a welding head provided with a plurality of electrodes and arranged to travel with the conveyor and means for raising the fixture and work into gripping relation with the welding electrodes to cause the same to travel along with the conveyor, comprising a fluid operated cylinder, lifting arms and connections between the fluid operated cylinder and the lifting arms for causing the lifting arms to lift the fixture into engagement with the welding head when fluid is turned into the cylinders.

JOSEPH R. LEX.